(12) United States Patent
Perez

(10) Patent No.: US 9,718,737 B2
(45) Date of Patent: Aug. 1, 2017

(54) DECORATIVE COATING COMPOSITIONS

(71) Applicant: Behr Process Corporation, Santa Ana, CA (US)

(72) Inventor: Hector Antonio Perez, Rowland Heights, CA (US)

(73) Assignee: Behr Process Corporation, Santa Ana, CA (US)

( * ) Notice: Subject to any disclaimer, the term of this patent is extended or adjusted under 35 U.S.C. 154(b) by 70 days.

(21) Appl. No.: 14/692,205

(22) Filed: Apr. 21, 2015

(65) Prior Publication Data

US 2016/0311725 A1 Oct. 27, 2016

(51) Int. Cl.

| C08K 3/18 | (2006.01) |
| C04B 41/63 | (2006.01) |
| C09D 5/02 | (2006.01) |
| C09D 7/12 | (2006.01) |
| C09D 133/00 | (2006.01) |
| C04B 41/45 | (2006.01) |
| C04B 41/48 | (2006.01) |
| C09D 133/06 | (2006.01) |
| C08K 3/34 | (2006.01) |

(52) U.S. Cl.
CPC .......... *C04B 41/63* (2013.01); *C04B 41/4596* (2013.01); *C04B 41/483* (2013.01); *C09D 5/02* (2013.01); *C09D 5/027* (2013.01); *C09D 7/1291* (2013.01); *C09D 133/00* (2013.01); *C09D 133/06* (2013.01); *C08K 3/34* (2013.01)

(58) Field of Classification Search
CPC .... C04B 41/63; C04B 41/483; C04B 41/4596
USPC ........................................................ 524/433
See application file for complete search history.

(56) References Cited

U.S. PATENT DOCUMENTS

| 2,509,857 | A | 5/1950 | Borcherdt et al. |
| 2,839,421 | A | 6/1958 | Albisetti et al. |
| 3,126,355 | A | 3/1964 | Birten et al. |
| 3,309,331 | A | 3/1967 | McDowell et al. |
| 3,318,850 | A | 5/1967 | Stilmar |
| 3,340,222 | A | 9/1967 | Fang |
| 3,705,076 | A | 12/1972 | Usala |
| 3,993,707 | A | 11/1976 | Cummings |
| 3,998,771 | A | 12/1976 | Feneis, Jr. et al. |
| 4,315,959 | A | 2/1982 | Brandts Buys et al. |
| 4,943,612 | A | 7/1990 | Morita et al. |
| 5,096,748 | A | 3/1992 | Balassa |
| 6,037,435 | A | 3/2000 | Hayashi et al. |
| 6,313,335 | B1 | 11/2001 | Roberts et al. |
| 6,512,042 | B1 | 1/2003 | Fischer et al. |
| 6,514,595 | B1 * | 2/2003 | Sprouts .................. C04B 28/02 106/676 |
| 6,635,192 | B1 | 10/2003 | Schwarz |
| 6,713,522 | B2 | 3/2004 | Zhang et al. |
| 6,849,338 | B2 | 2/2005 | Clemens et al. |
| 6,964,989 | B1 | 11/2005 | Fang et al. |
| 7,051,483 | B2 | 5/2006 | Bamford |
| 7,265,178 | B2 | 9/2007 | Maier et al. |
| 7,407,545 | B2 | 8/2008 | Wallner |
| 7,598,321 | B2 | 10/2009 | Talkowski |
| 7,652,121 | B2 | 1/2010 | Lenges et al. |
| 7,727,500 | B2 | 6/2010 | Andrews |
| 7,736,745 | B2 | 6/2010 | Hong |
| 7,811,376 | B2 | 10/2010 | Fechner et al. |
| 7,811,378 | B2 | 10/2010 | Nunges et al. |
| 7,833,343 | B2 | 11/2010 | Plueg et al. |
| 7,851,022 | B2 | 12/2010 | Schwarz |
| 7,875,112 | B2 | 1/2011 | Huber et al. |
| 7,901,731 | B2 | 3/2011 | Russell et al. |
| 7,905,955 | B2 | 3/2011 | Fechner et al. |
| 7,919,423 | B2 | 4/2011 | Feldman et al. |
| 7,938,900 | B2 | 5/2011 | Fechner et al. |
| 7,976,963 | B2 | 7/2011 | Olson, III et al. |
| 7,977,446 | B2 | 7/2011 | Feldman et al. |
| 8,025,976 | B2 | 9/2011 | Ogata et al. |
| 8,026,333 | B2 | 9/2011 | Feldman et al. |
| 8,092,555 | B2 | 1/2012 | Hertz et al. |
| 8,202,361 | B2 | 6/2012 | Fechner et al. |
| 8,221,537 | B2 | 7/2012 | Fechner et al. |
| 8,221,538 | B2 | 7/2012 | Fechner et al. |
| 8,308,861 | B2 | 11/2012 | Rolland et al. |
| 8,323,396 | B2 | 12/2012 | Hollman et al. |
| 8,404,204 | B2 | 3/2013 | Sergi et al. |
| 8,618,066 | B1 | 12/2013 | McDaniel |
| 8,623,462 | B2 | 1/2014 | Zapf et al. |
| 8,680,188 | B2 | 3/2014 | Plueg et al. |
| 8,898,981 | B2 | 12/2014 | Egan et al. |
| 2002/0045010 | A1 | 4/2002 | Rohrbaugh et al. |
| 2002/0119302 | A1 | 8/2002 | Fritz |
| 2003/0161960 | A1 | 8/2003 | Krieger et al. |
| 2003/0167878 | A1 | 9/2003 | Al-Salim et al. |
| 2003/0171047 | A1 | 9/2003 | Calvo et al. |
| 2004/0028826 | A1 | 2/2004 | Goecke et al. |
| 2004/0028909 | A1 | 2/2004 | Hodgson et al. |
| 2004/0068035 | A1 | 4/2004 | Paiva et al. |
| 2004/0185231 | A1 | 9/2004 | Dimmick |
| 2004/0249034 | A1 | 12/2004 | Meiners |
| 2005/0154084 | A1 | 7/2005 | Li et al. |
| 2005/0255330 | A1 | 11/2005 | Meyer |
| 2006/0262639 | A1 | 11/2006 | Bailey |
| 2007/0141386 | A1 | 6/2007 | Feldman et al. |

(Continued)

FOREIGN PATENT DOCUMENTS

CN 101633786 A 1/2010
CN 201539039 U 8/2010

(Continued)

OTHER PUBLICATIONS

Galan, Clay Minerals, 31, 443-453, 1996.*

(Continued)

*Primary Examiner* — Hui Chin
(74) *Attorney, Agent, or Firm* — Brooks Kushman P.C.

(57) ABSTRACT

A coating composition includes water, a plurality of flakes having a maximum dimension less than 0.05 inches, a plurality of inorganic fibers, a thixotropic suspending agent that is insoluble in water, and a resin. Decorative coating on a concrete substrate is also provided.

10 Claims, 2 Drawing Sheets

(56) References Cited

U.S. PATENT DOCUMENTS

| | | |
|---|---|---|
| 2007/0166534 A1 | 7/2007 | Entenmann et al. |
| 2007/0232736 A1 | 10/2007 | Liling |
| 2008/0069949 A1 | 3/2008 | Glockner et al. |
| 2008/0262144 A1 | 10/2008 | Glockner et al. |
| 2008/0305270 A1 | 12/2008 | Uhlianuk et al. |
| 2008/0305345 A1 | 12/2008 | Uhlianuk et al. |
| 2009/0004468 A1 | 1/2009 | Chen et al. |
| 2009/0018249 A1 | 1/2009 | Kanagasabapathy et al. |
| 2009/0030113 A1 | 1/2009 | Glockner et al. |
| 2009/0064894 A1 | 3/2009 | Baumgart et al. |
| 2009/0318594 A1 | 12/2009 | Grothe et al. |
| 2010/0120945 A1 | 5/2010 | Sahlberg et al. |
| 2010/0189940 A1 | 7/2010 | Grothe et al. |
| 2010/0261807 A1 | 10/2010 | Laine et al. |
| 2010/0324205 A1 | 12/2010 | Maier et al. |
| 2011/0028645 A1 | 2/2011 | Takahashi et al. |
| 2011/0041726 A1 | 2/2011 | Robb et al. |
| 2011/0042004 A1 | 2/2011 | Schubert et al. |
| 2011/0189391 A1* | 8/2011 | Matt ................. C08L 63/00 427/189 |
| 2011/0293839 A1 | 12/2011 | Cantu |
| 2012/0219805 A1 | 8/2012 | Yokoyama et al. |
| 2012/0308631 A1 | 12/2012 | Shirley et al. |
| 2013/0042791 A1 | 2/2013 | Bluvol et al. |
| 2013/0101861 A1 | 4/2013 | Cao et al. |
| 2013/0131193 A1 | 5/2013 | Gane et al. |
| 2013/0202879 A1 | 8/2013 | Gane et al. |
| 2013/0209535 A1 | 8/2013 | Yokoyama et al. |
| 2013/0209717 A1 | 8/2013 | Edwards et al. |
| 2013/0210963 A1 | 8/2013 | Dantin et al. |
| 2014/0005298 A1 | 1/2014 | Thewes |
| 2014/0303304 A1 | 10/2014 | Frost et al. |
| 2014/0343198 A1* | 11/2014 | Palaikis ................. A62D 1/0014 524/52 |

FOREIGN PATENT DOCUMENTS

| | | |
|---|---|---|
| CN | 102675993 A | 9/2012 |
| CN | 102718448 A | 10/2012 |
| CN | 102797316 A | 11/2012 |
| CN | 103102173 A | 5/2013 |
| CN | 103342513 A | 10/2013 |
| CN | 104 592 839 A | 5/2015 |
| EP | 0702709 A1 | 3/1996 |
| EP | 0778317 A1 | 6/1997 |
| EP | 0798349 A2 | 10/1997 |
| EP | 1 514 842 A1 | 3/2005 |
| EP | 2662416 A1 | 11/2013 |
| EP | 2662419 A1 | 11/2013 |
| GB | 629773 A | 9/1949 |
| GB | 769271 A | 3/1957 |
| GB | 835693 A | 5/1960 |
| GB | 948834 A | 2/1964 |
| GB | 956799 A | 4/1964 |
| GB | 957091 A | 5/1964 |
| GB | 962109 A | 6/1964 |
| GB | 992638 A | 5/1965 |
| GB | 998188 A | 7/1965 |
| GB | 1087999 A | 10/1967 |
| GB | 1 151 531 A | 5/1969 |
| GB | 1232578 A | 5/1971 |
| RU | 2320624 C1 | 1/2008 |
| WO | 94/26830 A1 | 11/1994 |
| WO | 2006/084523 A1 | 8/2006 |
| WO | 2006/125684 A1 | 11/2006 |
| WO | 2007/077057 A1 | 12/2007 |
| WO | 2009/013064 A2 | 1/2009 |
| WO | 2009/047102 A1 | 4/2009 |
| WO | 2011/082137 A1 | 7/2011 |
| WO | 2013/028640 A2 | 2/2013 |
| WO | 2013/034533 A2 | 3/2013 |
| WO | 2013/091686 A1 | 6/2013 |
| WO | 2014/052771 A1 | 4/2014 |
| WO | 2014/083102 A1 | 6/2014 |
| WO | 2014/097309 A1 | 6/2014 |

OTHER PUBLICATIONS

Chen, Q. et al., "Special coating liquid for stone paper coating and its preparation method," Database CAPLUS [Online], Chemical Abstracts Service, Columbus, Ohio, May 7, 2015, 4 pgs. (Abstract).

* cited by examiner

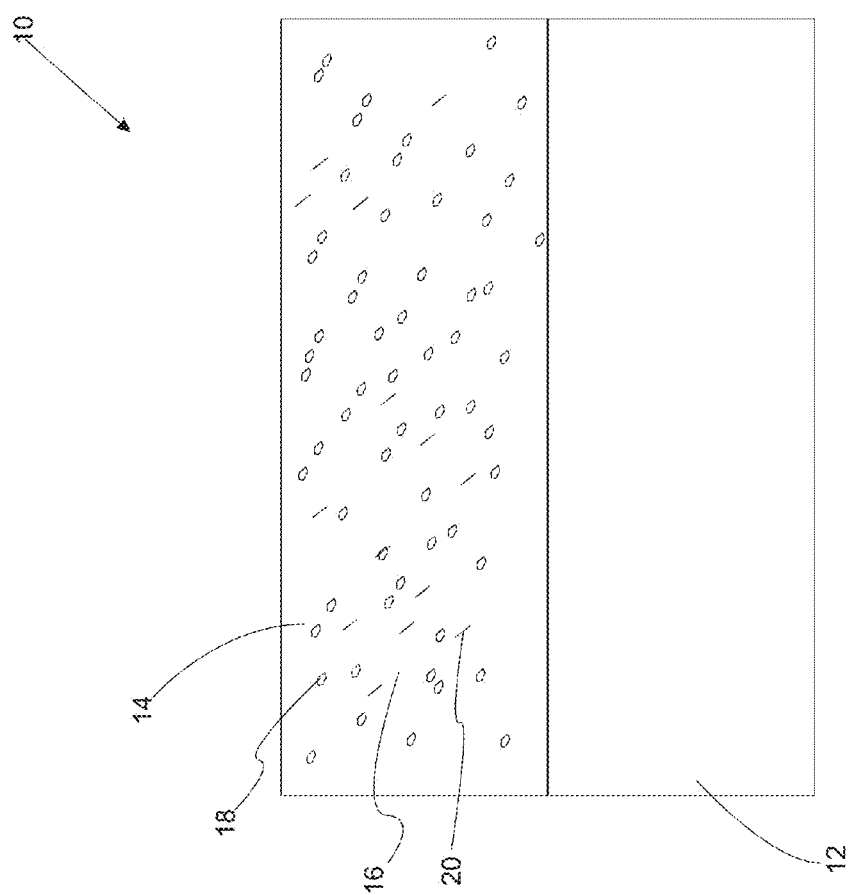

Table. 2. Comparative Study

| | Invention Example | Comparative Example 1 | Comparative Example 2 | Comparative Example 3 |
|---|---|---|---|---|
| Stormer Viscosity (KU's) | 115 | 118 | 77.8 | 114.1 |
| Heat Stability (KU difference) | 10 | 11.2 | -7.1 | 3 |
| pH | 9.1 | 7.86 | 8.16 | 8.51 |
| GLOSS (20/60/85) | 0.4/2.1/2.9 | 0.3/2.4/0.8 | 0.4/2.4/3.3 | 3.9/18.5/10.5 |
| Dry//Wet Adhesion 1 Day | 5B//5B | 4B//3B | 4B//4B | 3B//1B |
| Dry//Wet Adhesion 3 Days | 5B//5B | 3B//3B | 4B//4B | 3B//3B |
| Dry//Wet Adhesion 7 Days | 5B//5B | 4B//3B | 4B//3B | 4B//3B |
| Water Softening (fingernail scratch) | PASS | PEELING | PEELING | PEELING |
| Low Temperature Coalescence | PASS | PASS | PASS | FAIL (CRACKING) |
| Chemical Resistance | | | | |
| anti-freeze | PASS | PASS | PASS | PASS |
| brake fluid | PASS | PASS | PASS | PASS |
| engine oil | PASS | STAIN | PASS | SLIGHT PEELING |
| transmission fluid | PASS | PASS | PASS | PASS |
| wiper fluid | PASS | PASS | PASS | STAIN |
| alkali solution | PASS | PASS | COLOR CHANGE | PASS |
| fantastic | PASS | PASS | COLOR CHANGE | SLIGHT PEELING |
| gasoline | PASS | STAIN | COLOR CHANGE | PASS |
| bleach | PASS | PASS | PASS | STAIN |
| soda | PASS | PASS | PASS | STAIN |
| BBQ sauce | PASS | STAIN | STAIN | STAIN |
| ketchup | PASS | PASS | PASS | STAIN |
| coffee | PASS | STAIN | STAIN | STAIN |
| wine | STAIN | STAIN | STAIN | STAIN |
| mustard | STAIN | STAIN | STAIN | STAIN |
| Dirt Pick-up Resistance (DPUR) | <60% | <20% | <60% | <80% |
| Coefficient of Friction | 0.74 | 0.66 | 0.86 | 0.62 |
| Crack-bridging | PASS | PASS | FAIL | FAIL |

DECORATIVE COATING COMPOSITIONS

TECHNICAL FIELD

The present invention relates to a decorative coating composition for concrete substrates.

BACKGROUND

Hard surfaces made from materials such as concrete are ubiquitous. These surfaces are found in many industrial and home environments. For example, cement and concrete surfaces are found in most industrial shops, garages, sidewalks, and the like. Over time, the appearance of these surfaces degrades due to staining and contamination from the environment.

Decorative coatings for concrete and cement surfaces are known. A type of decorative coating for these applications includes a plurality of colored flakes dispersed in resinous layers. Most prior art coating processes involve applying a resin to the surface and then introducing flakes or flecks (i.e., broadcasting) over the applied layer before it has dried. The coated layer is then over-coated with one or more additional resinous layers to ensure that the flakes are not exposed. Exposure of the flakes leads to an undesirable appearance over time as well as premature failure of the coating. Although this process works reasonably well, the multiple steps necessary for applying such layers make the process complicated and tedious.

Accordingly, there is a need for improved methods and compositions for coating hard surfaces.

SUMMARY

The present invention solves one or more problems of the prior art by providing, in at least one embodiment, compositions that are suitable for coating concrete. The coating composition includes water, a plurality of flakes having a maximum dimension less than 0.05 inches, a plurality of inorganic fibers, a thixotropic suspending agent that is insoluble in water, and a resin.

In another embodiment, a coated substrate formed from the coating composition is provided. The coated substrate includes a substrate with a decorative layer disposed over the substrate. The decorative layer includes a resin, a plurality of flakes having a maximum dimension less than 0.05 inches dispersed within the resin, and a plurality of inorganic fibers dispersed within the resin. In a refinement, the decorative layer is not over-coated with any other resinous layers.

In still another embodiment, a method for forming the coated substrate includes a step of applying the coating composition set forth above to a substrate. The coating composition is allowed to cure to form the coated substrate. Advantageously, this method does not involve broadcasting the flakes to a wet resinous pre-layer while avoiding additional over-coat layers.

BRIEF DESCRIPTION OF THE DRAWINGS

FIG. 1 provides a schematic cross section of a substrate coated with a decorative layer; and FIG. 2 provides a table comparing a composition of the invention to commercial coatings.

DETAILED DESCRIPTION

Reference will now be made in detail to presently preferred compositions, embodiments and methods of the present invention which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

The term "aspect ratio" as used in at least one embodiment refers to the ratio of the minimum and maximum dimensions of a particle. In a refinement, the aspect ratio is the ratio of the minimum and maximum Feret diameters of a particle. For example, the aspect ratio of a circular particle is 1. The aspect ratio for a flat particle such as a flake has low numbers less than 0.2 and can approach zero if sufficiently thin.

The term "Feret diameters" as used in at least one embodiment refers to the distance between two tangents parallel to the opposite sides of a particle.

The term "residue" as used in at least one embodiment refers to that portion of a chemical compound that remains in a layer after drying and/or curing takes place to form these dried layers.

The term "dominant wavelength" refers to a way of describing polychromatic light mixtures in terms of monochromatic light that evokes an identical perception of hue. It is determined on the CIE color coordinate space by straight line the color coordinates for the color of interest and the coordinates for the illuminate. The intersection at the perimeter of the coordinate space nearest the color of interest is the dominant wavelength.

In an embodiment, a coating composition suitable for applying a decorative coating on a hard surface is provided. Examples of such hard surfaces include, but are not limited to, concrete, granite, and cement surfaces. The coating composition includes water, a plurality of flakes having a maximum dimension less than 0.05 inches, a plurality of inorganic fibers, a thixotropic suspending agent that is insoluble in water, and a resin. Typically, the plurality of flakes includes opaque flakes, and in particular, colored flakes.

In the context of the present invention, the term "flakes" refers to substantially flat particles having two dimensions that are of similar extent and a third dimension that is much smaller. As used herein the terms "flakes" and "flecks" are interchangeable. The flakes have a maximum dimension less than 0.05 inches. The maximum dimension is the longest dimension of the flake and is sometimes referred to as the length. In a refinement, the flakes have a maximum dimension less than, in increasing order of preference, 0.05 inches, 0.04 inches, 0.03 inches, 0.02 inches, or 0.01 inches on average. In a refinement, the flakes have a maximum dimension greater than, in increasing order of preference, 0.001 inches, 0.005 inches, 0.007 inches, 0.01 inches, or 0.012 inches on average. Characteristically, the flakes are opaque and are colored. In particular, the flakes have a dominant wavelength in the visible region of the electromagnetic spectrum (i.e., a wavelength of light from 390 to 700 nm). In a variation, a majority or more (>50 number percent) of the flakes in the plurality of flakes have an aspect ratio (e.g., thickness to length) less than 1:5 and greater than 0:1. In a refinement, a majority or more (>50 number percent) of the flakes in the plurality of flakes have an aspect ratio less than 1:5, 1:10, 1:20; 1:50; or 1:100. In another refinement, a majority or more (>50 number percent) of the flakes in the plurality of flakes have an aspect ratio greater than 1:2000, 1:1000, 1:500; 1:10; or 1:50. Suitable colored flakes include polymeric resins, inorganic particles, and pigment. An example of colored flakes are the Polymer ColorFlakes™ commercially available from Torginol, Inc. located in Sheboygan, Wis.

In some refinements, the plurality of flakes is present in an amount greater than, in increasing order of preference, 1 weight percent, 2 weight percent, 5 weight percent, 10 weight percent, 15 weight percent, or 20 weight percent of the total weight of the coating composition. In other refinements, plurality of flakes is present in an amount less than, in increasing order of preference, 60 weight percent, 55 weight percent, 50 weight percent, 45 weight percent, 40 weight percent, 30 weight percent, or 25 weight percent of the total weight of the coating composition.

The present invention includes a suspending agent, and in particular, a thixotropic suspending agent. The term "suspending agent" means a component that maintains components in the coating composition dispersed thereby delaying the time it takes for the flakes and other water insoluble components from settling. In one variation, the suspending agent includes magnesium silicate, and in particular, a hydrated magnesium silicate. Examples of useful hydrated magnesium silicates have chemical formulae $Mg_8Si_{12}O_{30}(OH)_4(OH_2)_4 \cdot 8H_2O$ or $Mg_4Si_6O_{15}(OH)_2 \cdot 6H_2O$. In a refinement, the suspending agent includes needle-shaped particles having a length from about 1 to 5 microns and a surface area from about 100 to 500 $m^2$/gram. An example of such needle shaped particles includes sepiolite clay. Sepiolite is a clay mineral of magnesium silicate. A typical formula for sepiolite clay is $Mg_4Si_6O_{15}(OH)_2 \cdot 6H_2O$. A specific example of a useful suspending agent include ATTAGEL™ commercially available from BASF Corporation located in Wyandotte Mich.; PANGEL™ Rheology Modifiers commercially available from ISCA UK LTD located in Newport United Kingdom; and LAPONITE™ commercially available from ALTANA AG located in Wesel Germany.

In a refinement, the plurality of flakes is present in an amount of 0.2 to 4 weight percent of the total weight of the coating composition. In some refinements, the suspending agent is present in an amount greater than, in increasing order of preference, 0.5 weight percent, 0.1 weight percent, 0.2 weight percent, 0.3 weight percent, 0.5 weight percent, or 1 weight percent of the total weight of the coating composition. In other refinements, the suspending agent is present in an amount less than, in increasing order of preference, 10 weight percent, 8 weight percent, 5 weight percent, 4 weight percent, 3 weight percent, or 2.5 weight percent of the total weight of the coating composition.

As set forth above, the coating composition includes a resin. Typically, the resin includes at least one acrylic resin. It should be appreciated that the acrylic resins used herein are often obtained and introduced into the coating composition as aqueous emulsions. . In some refinements the acrylic resins are copolymer and/or are cross-linked. Examples of useful resins includes CRILAT™ 4815 commercially available from Vinavil, SpA located in Milano Italy and EPS® 2293 commercially available from EPS materials located in Marengo Ill. The following amounts for the resin are provided in terms of the actual amounts of resin (e.g., solids) in the composition. In a refinement, the resin is present in an amount from about 10 to 70 weight percent with the balance being water. In some refinements, the resin is present in an amount greater than, in increasing order of preference, 5 weight percent, 8 weight percent, 10 weight percent, 12 weight percent, 15 weight percent, or 20 weight percent of the total weight of the coating composition. In other refinements, the resin is present in an amount less than, in increasing order of preference, 60 weight percent, 50 weight percent, 40 weight percent, 45 weight percent, 30 weight percent, or 25 weight percent of the total weight of the coating composition.

As set forth above, the coating composition also includes a plurality of inorganic fibers. Suitable inorganic fibers include metal oxides such as silicon oxide, aluminum oxide, CaO+MgO, and the like, and combinations thereof. In a refinement, the inorganic fibers have an average length from about 50 to 800 microns and an average diameter from about 1 to 10 microns. An example of a useful inorganic fiber is CoatForce® CF30 commercially available from Lapinus Fibres located in The Netherlands. In one refinement, the inorganic fibers are present in an amount from about 0.5 to 5 weight percent of the total weight of the composition. In some refinements, the inorganic fibers are present in an amount greater than, in increasing order of preference, 0.1 weight percent, 0.3 weight percent, 0.5 weight percent, 0.8 weight percent, 1.0 weight percent, or 2.0 weight percent of the total weight of the coating composition. In other refinements, the inorganic fibers are present in an amount less than, in increasing order of preference, 15 weight percent, 10 weight percent, 8 weight percent, 5 weight percent, 4 weight percent, or 3 weight percent of the total weight of the coating composition.

Certain variations of the coating composition include one or more additional additives selected from the group consisting of pigments, solvents, thickeners, surfactants, defoamers, preservatives, buffers, and combinations thereof. The total amount of additives is present in an amount from about 0.1 to 20 weight percent of the total weight of the coating composition. In a refinement, the total amount of additives is present in an amount from about 0.1 to 10 weight percent of the total weight of the coating composition. In another refinement, each additive when present is independently present in an amount greater than 0.01 weight percent, 0.03 weight percent, 0.05 weight percent, 1 weight percent, 2.0 weight percent, or 3.0 weight percent of the total weight of the coating composition. In still another refinement, each additive when present is independently present in an amount less than 15 weight percent, 10 weight percent, 5.0 weight percent, 3.0 weight percent, 2.0 weight percent, or 1.0 weight percent of the total weight of the coating composition.

Specific examples of suitable dispersant include Tetrapotassium pyrophosphate (TKPP) and potassium tripolyphosphate (KTPP). Additional examples include TAMOL™ 2011, TAMOL™ 731a, TAMOL™ 2002, and TAMOL 198 1124 commercially available from The Dow Chemical Company located in Midland Mich. Specific examples of suitable thickeners include SCT 275, RM8W, RM12W, RM 895, and RM 825commercially available from The Dow Chemical Company located in Midland Michigan. Specific examples of suitable surfactants include TERGITOL™ NP-9, TRITON™ X405, TRITON™ CF-10 commercially available from the Dow Chemical Company located in Midland Mich. Specific examples of suitable solvents propylene glycol, triethylene glycol, TEXANOL™ commercially available from Eastman Chemical Company located in Kingsport Tenn., and BUTYL CELLOSOLVE™ (e.g. ethylene glycol monobutyl ether) commercially available from The Dow Chemical Company located in Midland Mich. Specific examples of suitable defoamers includes BYK 22 and BYK 024 commercially available from ALTANA AG located in Wessel Germany; DREW™ T-4507 and DREW™ L-475 commercially available from Ashland, Inc.; TEGO™ 810 commercially available from Evonik Industries AG located in Essen, North Rhine-Westphalia, Germany; and FOAMSTAR™ A12 commercially available from BASF corporation located in Wyandotte Mich.

As set forth above, the coating composition may also include various pigments to impart additional properties as desired. For example glow in the dark, metallic, infrared reflecting, and colored pigments can be added. Moreover, pigments can be added to improve scuff resistance.

The balance of the coating composition is water. Clearly, the sum of all the components of the coating composition totals to 100 percent. Typically, water is present in an amount from about 10 to 30 weight percent. In some refinements, water is present in an amount from about 5 to 50 weight percent of the coating composition.

In another embodiment, a coated substrate formed from the coating composition set forth above is provided. With reference to FIG. 1, a schematic cross section of a coated substrate is provided. Coated substrate 10 includes substrate 12 with a decorative layer 14 disposed over the substrate. Decorative layer 14 includes a resin 16, a plurality of flakes 18 having a maximum dimension less than 0.05 inches dispersed within the resin, and a plurality of inorganic fibers 20 dispersed within the resin. Characteristically, the decorative layer is not over-coated with any other resinous layers. The coated substrate is formed applying the coating composition set forth above to a substrate. The coating composition is allowed to cure to form the coated substrate. Advantageously, this method does not involve broadcasting the flakes to a wet resinous pre-layer. Moreover, the present method avoids using additional over-coat layers.

The following examples illustrate various embodiments of the present invention. Those skilled in the art will recognize many variations that are within the spirit of the present invention and scope of the claims.

Table 1 provides an example of a coating composition is useful for forming a decorative layer on a concrete or cement substrate. The resulting decorative coating are categorized by variously standard test methods. For example, gloss can be determined by test methods set forth in ASTM D523 and ASTM D823; adhesion (Cross hatch) can be determined by test methods set forth in ASTM D3359; chemical resistance can be determined by test methods set forth in ASTM D1308; and coefficient of friction (James Test) can be determined by test methods set forth in ASTM D4103, ASTM F489, and ASTM 2047. Table 2 in FIG. 2 provides a comparison of the composition with several commercially available coating systems. A composition of the present invention is observed to provide an overall superior performance to all of the commercial processes that were tested. The improved stain/chemical resistance, water resistance and adhesive properties are observed to be significantly improved.

TABLE 1

| Coating composition | |
| --- | --- |
| Ingredient | Range (%). |
| water | 10.0-20.0 |
| Polymeric Pigment | 0.05-3.0 |
| Dispersant | |
| Surfactant/Defoamer | 0.05-2.0 |
| Acetylene Diol Surfactant | 0.1-2.0 |
| Glycol Solvent | 0.1-2.0 |
| Defoamer | 0.05-1.0 |
| Suspending agent | 0.1-2.5 |
| Glycol ether Solvent | 0.2-4.0 |
| Mineral Fiber | 1.0-5.0 |
| Acrylic Resin | 35.0-50.0 |
| Cellulosic Thickener | 0.1-2.0 |
| Buffer | 0.05-1.5 |
| In can preservative | 0.05-2.5 |
| Associative Thickener | 0.05-10.0 |
| Mildewcide/Algaecide | 0.05-3.0 |
| Flecks (Colored Chips) | 10.0-50.0 |
| Defoamer | 0.05-1.5 |
| TOTAL | 100% |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coating composition comprising:
   a plurality of flakes present in an amount of 10 to 40 weight percent, the plurality of flakes having a maximum dimension less than 0.05 inches;
   a plurality of inorganic fibers present in an amount from about 0.5 to 5 weight percent;

a thixotropic suspending agent present in an amount from about 0.2 to 4 weight percent, the thixotropic suspending agent being insoluble in water; and a resin present in an amount from 10 to 25 weight percent with the balance of the coating composition being water.

2. The coating composition of claim 1 wherein the plurality of flakes includes colored flakes.

3. The coating composition of claim 1 wherein the plurality of flakes include particles having an aspect ratio greater than 10.

4. The coating composition of claim 1 wherein the thixotropic suspending agent includes magnesium silicate.

5. The coating composition of claim 1 wherein the thixotropic suspending agent includes needle-shaped particles having a length from about 1 to 5 microns and a surface area from about 100 to 500 $m^2$/gram.

6. The coating composition of claim 1 wherein the thixotropic suspending agent includes sepiolite clay.

7. The coating composition of claim 1 wherein the resin includes at least one acrylic resin.

8. The coating composition of claim 1 wherein water is present in an amount from about 10 to 30 weight percent.

9. The coating composition of claim 1 further including an additive selected from the group consisting of pigments, solvents, thickeners, surfactants, defoamers, preservatives, buffers, and combinations thereof.

10. The coating composition of claim 9 wherein the additive is present in an amount from about 0.1 to 10 weight percent.

* * * * *